United States Patent
Christensen et al.

(10) Patent No.: US 12,110,064 B2
(45) Date of Patent: Oct. 8, 2024

(54) PANEL STORAGE AND TWO TIER LOADING SYSTEM

(71) Applicant: GM Global Technology Operations LLC, Detroit, MI (US)

(72) Inventors: Blaine D. Christensen, Sterling Heights, MI (US); William A. McDonald, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 491 days.

(21) Appl. No.: 17/529,401

(22) Filed: Nov. 18, 2021

(65) Prior Publication Data
US 2023/0150583 A1    May 18, 2023

(51) Int. Cl.
*B62D 33/02*    (2006.01)
*B60R 9/06*    (2006.01)

(52) U.S. Cl.
CPC ............ *B62D 33/0207* (2013.01); *B60R 9/06* (2013.01)

(58) Field of Classification Search
USPC ......................................................... 296/37.6
See application file for complete search history.

(56) References Cited

U.S. PATENT DOCUMENTS

| | | | | |
|---|---|---|---|---|
| 6,068,319 | A * | 5/2000 | O'Brien | B60P 1/00 296/37.6 |
| 6,464,276 | B1 * | 10/2002 | Gruich | B62D 33/0273 224/403 |
| 6,814,397 | B2 * | 11/2004 | Henderson | B62D 33/02 296/181.3 |
| 9,868,403 | B2 * | 1/2018 | Pulleyblank | B60R 9/06 |
| 10,780,836 | B1 * | 9/2020 | Fisher | B60R 9/02 |
| 10,933,796 | B2 * | 3/2021 | Beenen | B60N 2/2245 |
| 11,279,421 | B1 * | 3/2022 | Hoogendoorn | B60R 9/06 |
| 11,548,569 | B2 * | 1/2023 | Grabowski | B62D 33/023 |
| 2009/0212584 | A1 | 8/2009 | Hill | |

OTHER PUBLICATIONS

German Application No. 10 2022 123 929.2 filed Sep. 19, 2022; German Office Action dated Dec. 14, 2023; 5 pages.

* cited by examiner

*Primary Examiner* — Joseph D. Pape
(74) *Attorney, Agent, or Firm* — CANTOR COLBURN LLP

(57) ABSTRACT

A panel storage system for a vehicle includes a panel body including a first panel portion having a first plurality of mounting elements, a second panel portion having a second plurality of mounting elements, and a hinge joining the first panel portion to the second panel portion. The first panel portion is fixedly mountable to a surface of the vehicle and the second panel portion is pivotable about the hinge.

20 Claims, 5 Drawing Sheets

PANEL STORAGE AND TWO TIER LOADING SYSTEM

INTRODUCTION

The subject disclosure relates to the art of vehicles and, more particularly, to a panel storage and two tier loading system for a vehicle.

Vehicles, such as pickup trucks, include limited storage options due to the presence of a truck bed. Manufacturers have developed many creative storage solutions for pickup trucks. Storage has been provided in under seat bins, behind seat bins, in body bed side storage, and the like. After market options include molle panels that may be mounted to various vehicle surfaces including interior bed side surfaces, under rear seats, on rear surfaces of front and back seats, undersides of center console lids and the like. Other devices available from aftermarket suppliers include bed sliders, drawers, and/or boxes arranged in a vehicle bed.

While helpful, the above described solutions possess several drawbacks. Under seat mounting takes away from other under seat storage options. Back of seat storage may take up leg room; in body, bed side boxes are small; and molle panels create voids of unusable space. Further, adding bed sliders, drawers, or other boxes in the vehicle bed reduces available space for carrying wood panels, and other similar items. Accordingly, it is desirable to provide more flexible storage options in a vehicle that accommodates multiple articles yet allows for a full use of the vehicle bed.

SUMMARY

Disclosed, in accordance with a non-limiting example, is a panel storage system for a vehicle includes a panel body including a first panel portion having a first plurality of mounting elements, a second panel portion having a second plurality of mounting elements, and a hinge joining the first panel portion to the second panel portion. The first panel portion is fixedly mountable to a surface of the vehicle and the second panel portion is pivotable about the hinge.

In addition to one or more of the features described herein the first panel portion includes a first plurality of openings, the first plurality of mounting elements being defined by sections of the first panel portion between adjacent ones of the first plurality of openings.

In addition to one or more of the features described herein the second panel portion includes a second plurality of openings, the second plurality of mounting elements being defined by sections of the second panel portion between adjacent ones of the second plurality of openings.

In addition to one or more of the features described herein the second panel portion includes a latch member detachably connecting the second panel portion to the surface of the vehicle.

Also disclosed in accordance with a non-limiting example is a vehicle including a body having a passenger compartment portion and a bed portion. The bed portion includes a first side wall and an opposing second side wall. A panel storage system for a vehicle includes a panel body including a first panel portion having a first plurality of mounting elements, a second panel portion having a second plurality of mounting elements, and a hinge joining the first panel portion to the second panel portion. The first panel portion is fixedly mountable to a surface of the vehicle and the second panel portion is pivotable about the hinge.

In addition to one or more of the features described herein the first panel portion includes a first plurality of openings, the first plurality of mounting elements being defined by sections of the first panel portion between adjacent ones of the first plurality of openings.

In addition to one or more of the features described herein the second panel portion includes a second plurality of openings, the second plurality of mounting elements being defined by sections of the second panel portion between adjacent ones of the second plurality of openings.

In addition to one or more of the features described herein the second panel portion includes a latch member detachably connecting the second panel portion to the one of the first side wall and the second side wall.

In addition to one or more of the features described herein the panel body includes a first panel body mounted to the first side wall and a second panel body mounted to the second side wall, the second panel portion of the first panel body including a first surface facing the first side wall and a second surface, a second panel portion of the second panel body including a first surface section facing the second side wall and a second surface section.

In addition to one or more of the features described herein a panel extending between the first panel body and the second panel body along a third side wall of the bed connecting the first side wall and the second side wall.

In addition to one or more of the features described herein the panel extending between the first panel body and the second panel body along the third side wall includes a rib configured to support at least one of the second panel portion of the first panel body and the second panel portion of the second panel body.

In addition to one or more of the features described herein the panel extending between the first panel body and the second panel body comprises a panel storage member including a plurality of opening portions and a plurality of mounting element members defined between adjacent ones of the plurality of opening portions.

In addition to one or more of the features described herein the first surface of the second panel portion of the first panel body includes a first rib element and the first surface section of the second panel portion of the second panel body includes a second rib element.

In addition to one or more of the features described herein a storage compartment defined between the first side wall and the first surface of the first panel body.

In addition to one or more of the features described herein the first panel portion comprises a first molle panel and the second panel portion comprises a second molle panel.

Further disclosed, in accordance with a non-limiting example, is a method of storing articles in a vehicle including pivoting a first panel portion of a panel body mounted to a side wall of the vehicle relative to a second panel portion of the panel body, positioning an article in a storage zone defined between the panel body and the side wall of the vehicle, and pivoting the first panel portion to enclose the storage zone.

In addition to one or more of the features described herein pivoting the first panel portion includes pivoting a second molle panel portion connected by a hinge to a first molle panel portion.

In addition to one or more of the features described herein the method further includes pivoting a first panel portion of another panel body mounted to an opposing side wall of the vehicle relative to a second panel portion of the another panel body, and supporting an article on the first panel portion of the panel body and the first panel portion of the another panel body.

In addition to one or more of the features described herein supporting the article includes containing the article between a first rib on the first panel portion of the panel body and a second rib on the first panel portion of the another panel body.

In addition to one or more of the features described herein the method further includes supporting an end of the second panel portion of the panel body on a panel mounted to a third side surface extending between the first side surface and the second side surface, and supporting an end of the second panel portion of the another panel body on the panel mounted to the third side surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
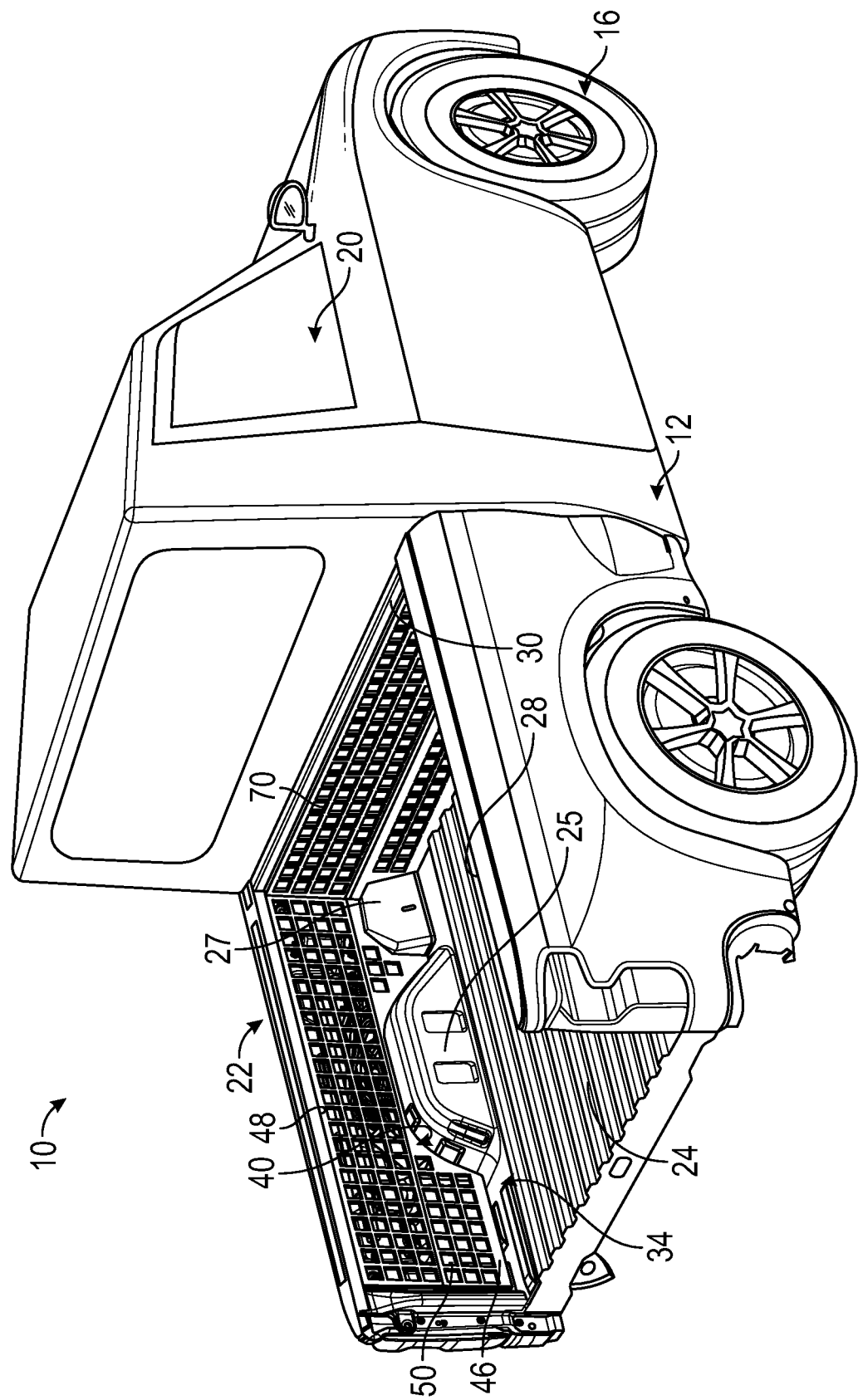
FIG. 1 depicts a pickup truck including a panel storage and two-tier loading system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, shown in the form of a pickup truck, in accordance with a non-limiting example, is indicated generally at 10 in FIG. 1. Vehicle 10 includes a body 12 supported by a plurality of wheels, one of which is indicated at 16. Body 12 includes a passenger compartment 20 and a bed portion 22. While shown as an open bed portion, vehicle 10 may include a closed bed portion such as is the case with an SUV, a minivan, a cargo van, and the like. Bed portion 22 includes a bed floor 24, a first wheel well 25, a second wheel well 26 (FIG. 5) a first side wall defining a first side surface 27, a second side wall defining a second side surface 28, and a forward or third side wall defining a third side surface 30. A tail gate 32 (FIG. 5) is pivotally connected to bed floor 24.

In a non-limiting example, a panel storage system 34 is mounted in bed portion 22. Panel storage system 34 creates side storage as well as second tier loading options in the form of a second tier storage. Second tier storage is spaced from bed floor 24 as will be detailed herein. Panel storage system 34 includes a first panel body 40 mounted to first side surface 27 and a second panel body 42 (FIG. 5) mounted to second side surface 28. At this point a description will follow with reference to first panel body 40 with an understanding that second panel body 42 includes corresponding structure in accordance with a non-limiting example.

Figure 2:
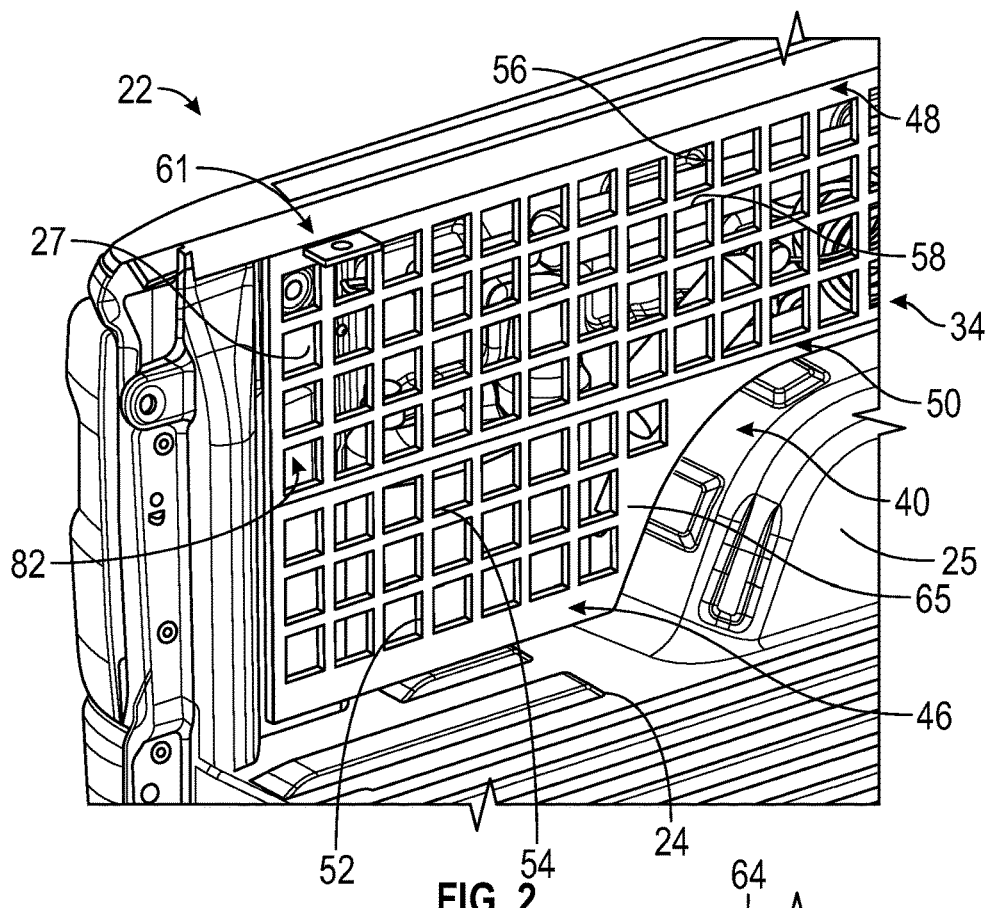
FIG. 2 depicts a portion of the panel storage and two-tier loading system mounted to an inner pickup truck bed wall arranged in a first configuration, in accordance with a non-limiting example.
Figure 3:
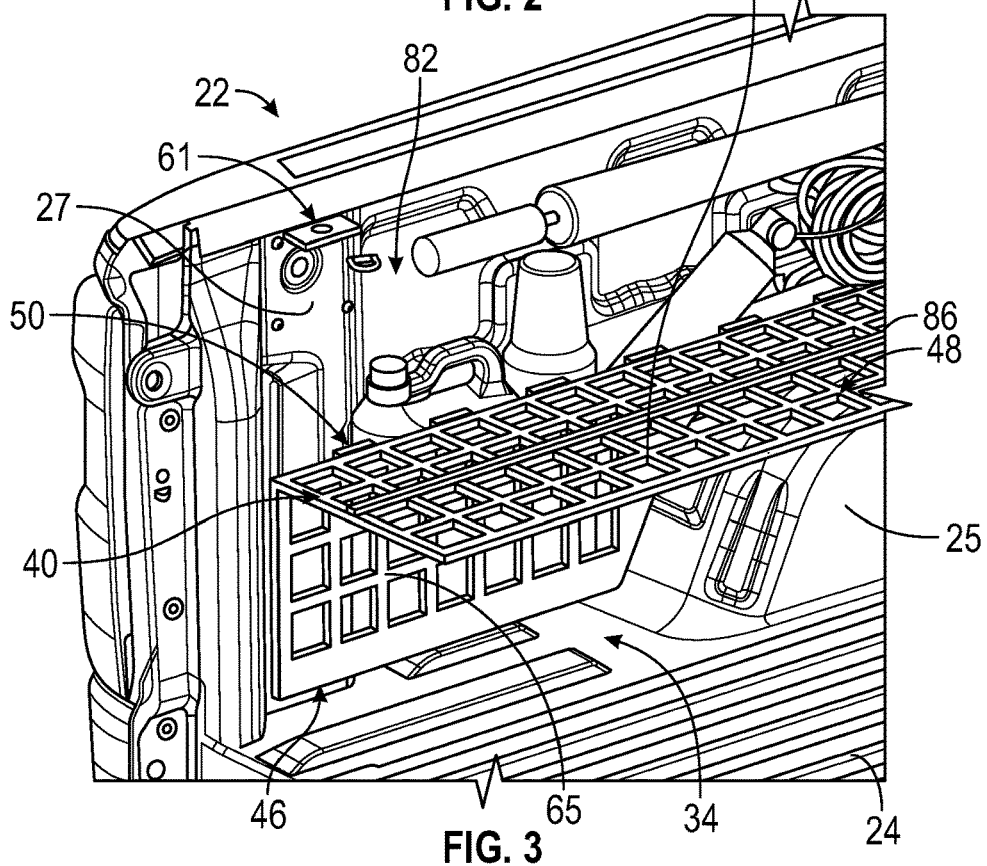
FIG. 3 depicts the panel storage and two-tier loading system of FIG. 2 in a second configuration, in accordance with a non-limiting example.

Referring to FIGS. 2 and 3 and with continued reference to FIG. 1, in a non-limiting example, first panel body 40 includes a first panel portion 46 and a second panel portion 48. In a non-limiting example, first panel portion 46 defines a first molle panel portion (not separately labeled) and second panel portion 48 defines a second molle panel portion (also not separately labeled). First panel portion 46 may be fixedly mounted to first side surface 27.

In a non-limiting example, second panel portion 48 is pivotally connected to first panel portion 46. That is, a hinge 50 connects second panel portion 48 to first panel portion 46. In a non-limiting example, first panel portion 46 includes a first plurality of openings 52 that define a first plurality of mounting elements 54. That is, sections of first panel portion 46 that form the plurality of openings 52 serve as structure that defines the first plurality of mounting elements 54. Similarly, second panel portion 48 includes a second plurality of openings 56 that define a second plurality of mounting elements 58. A latch member 61, mounted to first side surface 27, selectively secures second panel portion 48 in an upright configuration (FIG. 2). A second latch member (not shown) may also be added to further secure second panel portion in the upright configuration and increase security.

Figure 4:
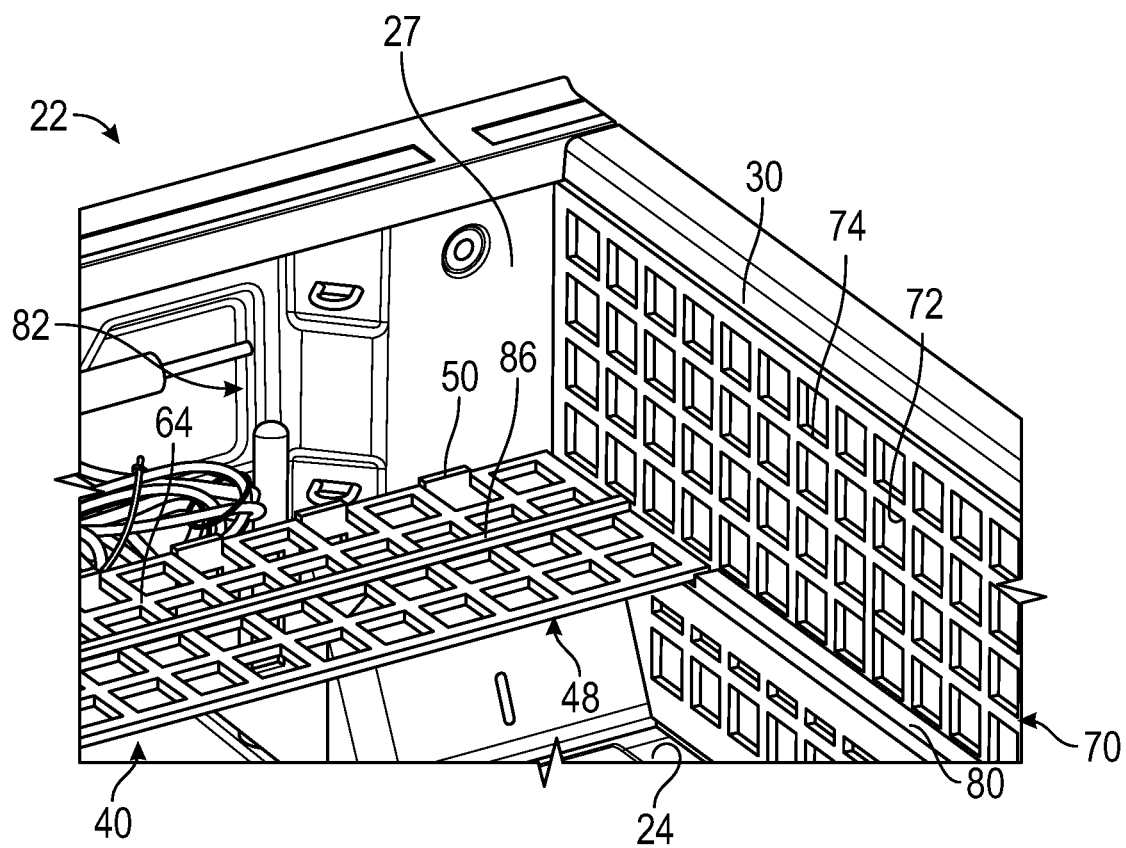
FIG. 4 depicts the panel storage and two-tier loading system of FIG. 3 showing a forward edge of a first panel portion supported on a rib on a forward wall of the pickup truck bed, in accordance with a non-limiting example.

In a non-limiting example, first panel body 40 includes a first surface 64 that faces first side surface 27 and a second surface 65. Similarly, second panel body 42 includes a first surface section 67 (FIG. 5) facing second side surface 28 and a second surface section 68. In a non-limiting example, panel storage system 34 also includes a panel (not separately labeled) that takes the form of a panel storage member 70 mounted to third side surface 30. As shown in FIG. 4, panel storage member 70 includes a third plurality of openings 72 that define a third plurality of mounting elements 74. A rib 80 extends across panel storage 70. In a non-limiting example, second panel portion 48 may be folded downward and a forward edge (not separately labeled) supported on rib 80 as shown in FIG. 4. Second panel body may be manipulated in a similar fashion.

In the downward position, first surface 64 defines a support (not separately labeled) that is spaced from bed floor 24 that forms a first storage tier so as to define a second storage tier. The support is raised above wheel wells (not separately labeled) that project upward into bed portion 22. This second tier allows larger articles, such as construction panels, dry wall sheets, plywood and the like to lie flat across a full width (e.g., from first side surface 27 to second side surface 28) of bed portion 22 above bed floor 24.

In a non-limiting example, when folded down, a storage zone 82, defined between first side surface 27 and first surface 64, is exposed. That is, first surface 64 of first panel body 40 is mounted to bed portion 22 and spaced from first side surface 27 such that an area for receiving articles is established. Securing second panel portion 48 to latch member 61 allows a user to securely store articles in storage zone 82. Thus, in addition to providing a second tier of storage, panel storage system 34 also allows a user to securely store articles in bed portion 22 without the need for a cap or other type of lockable cover.

Figure 5:
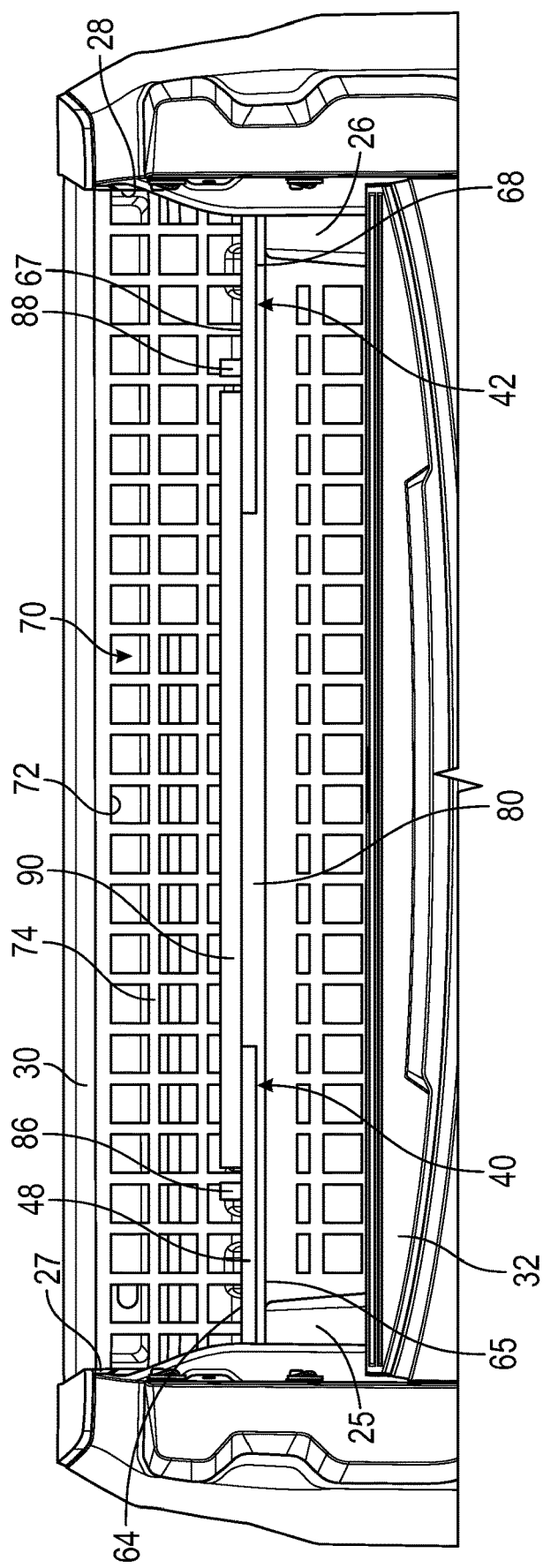
FIG. 5 depicts a guide rib and a panel on the first panel portion, in accordance with a non-limiting example.
Figure 6:
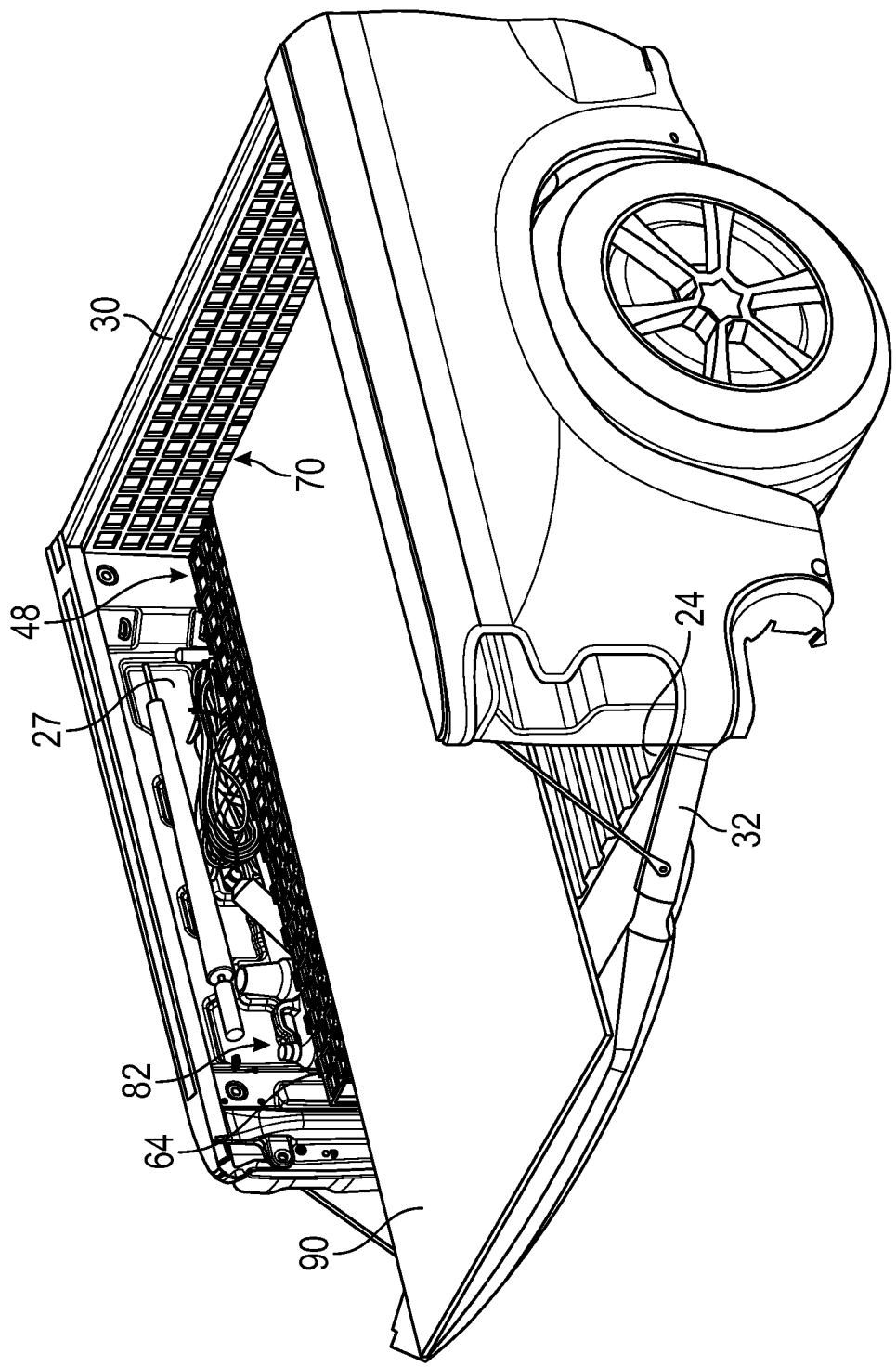
FIG. 6 depicts a panel supported on the first panel portion of the panel storage and two-tier loading system, in accordance with a non-limiting example.

Referring to FIGS. 5 and 6, in another non-limiting example, second panel portion 48 includes a first rib element 86 extending across first surface 64. Second panel body 42 includes a second rib element 88 extending across second surface section 68. First and second rib elements 86 and 88 are spaced one, from another so as to accommodate, for example, a sheet of plywood 90 on first and second panel bodies 40 and 42 elevated from bed floor 24. First and second rib elements 86 and 88 serve as a guide and a lateral support that ensures that the sheet of plywood 90 does not slip (e.g., slide from side-to-side) and fall from one or the other of first and second panel bodies 40 and 42.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A panel storage system for a vehicle that comprises a body including a passenger compartment portion and a bed portion, the bed portion including a first side wall and an opposing second side wall, the panel storage system configured to be mounted to one of the first side wall and the opposing second side wall, the panel storage system comprising:
    a panel body including a first panel portion having a first plurality of mounting elements, a second panel portion having a second plurality of mounting elements, and a hinge joining the first panel portion to the second panel portion,
    wherein the first panel portion is fixedly mountable to the one of the first side wall and the opposing second side wall and the second panel portion is pivotable about the hinge,
    wherein the panel body includes a first panel body mountable to the first side wall and a second panel body mountable to the second side wall, the second panel portion of the first panel body including a first surface configured to face the first side wall and a second surface, a second panel portion of the second panel body including a first surface section configured to face the second side wall and a second surface section,
    wherein the panel storage system further comprises a panel configured to extend between the first panel body and the second panel body along a third side wall of the bed connecting the first side wall and the second side wall, and
    wherein the panel configured to extend between the first panel body and the second panel body along the third side wall includes a rib configured to support at least one of the second panel portion of the first panel body and the second panel portion of the second panel body.

2. The panel storage system according to claim 1, wherein the first panel portion includes a first plurality of openings, the first plurality of mounting elements being defined by sections of the first panel portion between adjacent ones of the first plurality of openings.

3. The panel storage system according to claim 2, wherein the second panel portion includes a second plurality of openings, the second plurality of mounting elements being defined by sections of the second panel portion between adjacent ones of the second plurality of openings.

4. The panel storage system according to claim 1, wherein the second panel portion includes a latch member detachably connecting the second panel portion to the surface of the vehicle.

5. A vehicle comprising:
    a body including a passenger compartment portion and a bed portion, the bed portion including a first side wall and an opposing second side wall; and
    a panel storage system mounted to one of the first side wall and the opposing second side wall, the panel storage system including a panel body having a first panel portion including a first plurality of mounting elements, a second panel portion including a second plurality of mounting elements, and a hinge joining the first panel portion to the second panel portion, wherein the first panel portion is fixedly mounted to the one of the first side wall and opposing second side wall and the second panel portion is pivotable about the hinge,
    wherein the panel body includes a first panel body mounted to the first side wall and a second panel body mounted to the second side wall, the second panel portion of the first panel body including a first surface facing the first side wall and a second surface, a second panel portion of the second panel body including a first surface section facing the second side wall and a second surface section,
    wherein the vehicle further comprises a panel extending between the first panel body and the second panel body along a third side wall of the bed connecting the first side wall and the second side wall, and
    wherein the panel extending between the first panel body and the second panel body along the third side wall includes a rib configured to support at least one of the second panel portion of the first panel body and the second panel portion of the second panel body.

6. The vehicle according to claim 5, wherein the first panel portion includes a first plurality of openings, the first plurality of mounting elements being defined by sections of the first panel portion between adjacent ones of the first plurality of openings.

7. The vehicle according to claim 6, wherein the second panel portion includes a second plurality of openings, the second plurality of mounting elements being defined by sections of the second panel portion between adjacent ones of the second plurality of openings.

8. The vehicle according to claim 5, wherein the second panel portion includes a latch member detachably connecting the second panel portion to the one of the first side wall and the second side wall.

9. The vehicle according to claim 5, wherein the panel extending between the first panel body and the second panel body comprises a panel storage member including a plurality of opening portions and a plurality of mounting element members defined between adjacent ones of the plurality of opening portions.

10. The vehicle according to claim 5, wherein the first surface of the second panel portion of the first panel body includes a first rib element and the first surface section of the second panel portion of the second panel body includes a second rib element.

11. The vehicle according to claim 5, further comprising a storage compartment defined between the first side wall and the first surface of the first panel body.

12. The vehicle according to claim 5, wherein the first panel portion comprises a first molle panel and the second panel portion comprises a second molle panel.

13. A method of storing articles in a vehicle comprising:
pivoting a first panel portion of a panel body mounted to a side wall of the vehicle relative to a second panel portion of the panel body;
positioning an article in a storage zone defined between the panel body and the side wall of the vehicle;
pivoting the first panel portion to enclose the storage zone;
pivoting a first panel portion of another panel body mounted to an opposing side wall of the vehicle relative to a second panel portion of the another panel body;
supporting an article on the first panel portion of the panel body and the first panel portion of the another panel body;
supporting an end of the second panel portion of the panel body on a panel mounted to a third side surface extending between the first side surface and the second side surface; and
supporting an end of the second panel portion of the another panel body on the panel mounted to the third side surface.

14. The method of claim 13, wherein pivoting the first panel portion includes pivoting a second molle panel portion connected by a hinge to a first molle panel portion.

15. The method of claim 13, wherein supporting the article includes containing the article between a first rib on the first panel portion of the panel body and a second rib on the first panel portion of the another panel body.

16. The panel storage system according to claim 1, wherein the second plurality of mounting elements includes more mounting elements than the first plurality of mounting elements in a vertical direction of the vehicle.

17. The vehicle according to claim 5, wherein the second plurality of mounting elements includes more mounting elements than the first plurality of mounting elements in a vertical direction of the vehicle.

18. The panel storage system according to claim 3, wherein each of the first plurality of openings and the second plurality of openings are square openings.

19. The vehicle according to claim 7, wherein each of the first plurality of openings and the second plurality of openings are square openings.

20. The vehicle according to claim 5, wherein the vehicle further comprises a wheel well, and the second panel portion is disposed entirely above the wheel well.

* * * * *